(12) United States Patent
Chang (10) Patent No.: US 6,409,242 B1
(45) Date of Patent: Jun. 25, 2002

(54) FLAT THIN SCREEN T/V MONITOR AUTOMOTIVE ROOF MOUNT

(76) Inventor: Chung L. Chang, 22384 Lazy Trail Rd., Diamond Bar, CA (US) 91765

( * ) Notice: Subject to any disclaimer, the term of this patent is extended or adjusted under 35 U.S.C. 154(b) by 0 days.

(21) Appl. No.: 09/717,928

(22) Filed: Nov. 21, 2000

Related U.S. Application Data (60) Provisional application No. 60/248,981, filed on Nov. 14, 2000.

(51) Int. Cl.$^7$ ................................................. B60N 3/12
(52) U.S. Cl. ...................................... 296/37.7; 296/24.1
(58) Field of Search ............................. 296/37.7, 24.1

(56) References Cited

U.S. PATENT DOCUMENTS

| | | | |
|---|---|---|---|
| 3,737,184 A | | 6/1973 | Swartz |
| 4,824,159 A | | 4/1989 | Fluharty et al. |
| 4,982,996 A | | 1/1991 | Vottero-Fin et al. |
| 5,096,271 A | | 3/1992 | Portman |
| 5,109,572 A | | 5/1992 | Park |
| 5,177,616 A | | 1/1993 | Riday |
| 5,311,302 A | * | 5/1994 | Berry et al. ................. 348/14 |
| 5,359,349 A | | 10/1994 | Jambor et al. |
| 5,467,106 A | | 11/1995 | Salomon |
| 5,522,638 A | | 6/1996 | Falcoff et al. |
| 5,547,248 A | * | 8/1996 | Marechal ............... 297/188.17 |
| 5,583,735 A | | 12/1996 | Pease et al. |
| 5,705,860 A | * | 1/1998 | Ninh et al. ................... 207/91 |
| 5,709,360 A | * | 1/1998 | Rosen ..................... 248/278.1 |
| 5,775,762 A | * | 7/1998 | Vitito ........................ 296/37.7 |
| D399,200 S | | 10/1998 | Rosen |
| 5,822,023 A | * | 10/1998 | Suman et al. ............... 248/837 |
| 5,847,685 A | | 12/1998 | Otsuki |
| 5,927,784 A | * | 7/1999 | Vitito ........................ 296/37.7 |
| 5,940,120 A | * | 8/1999 | Frankhouse et al. ......... 348/61 |
| 5,946,055 A | * | 8/1999 | Rosen ........................ 348/837 |
| 5,996,954 A | * | 12/1999 | Rosen et al. ............. 248/278.1 |
| 6,007,036 A | * | 12/1999 | Rosen ..................... 248/286.1 |
| 6,055,478 A | * | 4/2000 | Heron ........................ 701/213 |
| 6,059,255 A | | 5/2000 | Rosen et al. |
| 6,115,086 A | * | 9/2000 | Rosen ........................ 348/837 |
| 6,124,902 A | * | 9/2000 | Rosen ........................ 348/837 |
| 6,125,030 A | | 9/2000 | Mola et al. |
| 6,157,418 A | * | 12/2000 | Rosen ........................ 348/837 |
| 6,179,263 B1 | * | 1/2001 | Rosen et al. ............. 248/278.1 |
| 6,181,387 B1 | * | 1/2001 | Rosen ........................ 348/837 |
| 6,186,459 B1 | * | 2/2001 | Ma ........................ 248/276.1 |
| 6,246,449 B1 | * | 6/2001 | Rosen ........................ 348/837 |
| 6,256,837 B1 | | 7/2001 | Lan et al. |
| D446,507 S | | 8/2001 | Rosen et al. |
| 6,292,236 B1 | | 9/2001 | Rosen |

FOREIGN PATENT DOCUMENTS

| | | |
|---|---|---|
| DE | 41 18 711 A1 | 10/1992 |
| JP | 5-50883 | 3/1993 |
| JP | 9-224202 | 8/1997 |

* cited by examiner

*Primary Examiner*—Ken Patel
(74) *Attorney, Agent, or Firm*—Knobbe, Martens, Olson & Bear LLP (57) ABSTRACT

A vehicle roof mounted video display is disclosed. The display is rotatable 180° about a first axis, between a stored position within a housing and a second position in which the display lies flat against the vehicle roof. The display is also rotatable at least 60°, and preferably 90°, about a second axis that intersects and is substantially perpendicular to the first axis. Each axis includes self-tensioning hinges to hold the display in any position. The display self aligns as it reaches either of the first and second positions so that the display is substantially parallel to the roof. When the display is in the storage position, the display screen faces, and is safely enclosed by, the housing. The invention also includes a number of built-in features to provide passengers with a wide range of entertainment options.

13 Claims, 10 Drawing Sheets

FLAT THIN SCREEN T/V MONITOR AUTOMOTIVE ROOF MOUNT

RELATED APPLICATION

This application claims priority to provisional application Ser. No. 60/248,981, filed on Nov. 14, 2000.

BACKGROUND OF THE INVENTION

1. Field of the Invention

The invention relates to devices for mounting video displays on the inside surface of an automobile roof. More specifically, the device provides a vehicle mounted video display that incorporates a wide range of entertainment options, is convenient to use and poses little risk of harm to passengers.

2. Description of the Related Art & Summary of the Invention

Overhead consoles for vans and other large vehicles are well known. One type of overhead console contains a video display screen and other components to keep passengers entertained on long journeys. These consoles are generally mounted near the center of the transverse axis of the vehicle with the display screen facing the rear. However, current overhead consoles for video display screens include features that make them either unsafe or inconvenient to use, or both.

U.S. Pat. No. 6,125,030 to Mola discloses a vehicle overhead console with flip down navigation unit. The vehicle overhead console assembly includes a console body with a door pivotally attached to the console body. The door is pivotally movable between open and closed positions. A navigation display unit is connected to the door such that the navigation display unit is exposed for viewing by a vehicle occupant when the door is in the open position, and hidden from view when the door is in the closed position. A groove in a substantially U-shaped flexible latch member engages an edge portion of the console body for securing the door in the latched position. The pins on which the door pivots engage a plurality of detents to hold the door in the desired open position.

The principal drawback of the '030 device is the hazard that it poses to passengers. The device swings forward, from a stored position, to a viewing position where the display screen is substantially perpendicular to the roof of the vehicle. Due to the design of the pivots and the obstruction posed by the console body, the screen cannot swing forward any farther than this position. Thus, it poses a significant obstacle for passengers moving within the vehicle. A passenger who is thrown forward during a collision could be seriously injured by striking the screen.

Another drawback of the '030 design is the limited range of viewing positions available for the display screen. The screen may only rotate about one axis, as described. The screen may not be rotated to the left or right to accommodate viewers who are not seated directly in front of the screen. This drawback is especially acute if the display screen is an LED, which can only be seen from a narrow range of angles in front of the screen.

U.S. Pat. No. 5,775,762 to Vitito discloses an overhead console having a flip-down monitor. The console includes an elongated console housing having a leading end and a trailing end, a monitor mounted in the leading end of the console housing, and a compartment for storing a source of video signals.

The '762 design flips downward from a storage position, in which the screen faces the floor of the vehicle, to a viewing position in which the screen faces the back of the vehicle. Like the '030 design, the display may not be rotated farther than this position in which the display is perpendicular to the roof of the vehicle. Thus, the display of the '762 design poses a hazard to passengers moving toward the rear of the vehicle. Neither may the screen be rotated to the left or right, limiting the range of viewing positions for passengers. Furthermore, the display screen, which is typically glass, is always exposed to the interior of the vehicle. Thus, inadvertent contact with the screen is potentially hazardous to passengers even when the display is in a storage position.

The invention provides a vehicle roof mounted video display. The display is rotatable 180° about a first axis, between a stored position within a housing and a second position in which the display lies flat against the vehicle roof. The display is also rotatable at least 60°, and preferably 90°, about a second axis that intersects and is substantially perpendicular to the first axis. Each axis includes self-tensioning hinges to hold the display in any position.

The display self aligns as it reaches either of the first and second positions. Force acting on the edge of the display as it approaches the roof or the housing causes the display to rotate about the second axis until the display is substantially parallel to the roof. The rotational capability of the display, 180° in one direction and between 60° and 90° in another, allows the display to be easily displaced when contacted by a passenger or other object. Thus, the display does not pose a significant hazard to a passenger who inadvertently bumps into it, either casually or during, a vehicle collision.

When the display is in the storage position, the display screen desirably faces, and is safely enclosed by, the housing. The display screen is protected from damage in this position, and passengers are protected from broken pieces of the display screen as might result from a vehicle collision.

The invention also includes a number of built-in features to provide passengers with a wide range of entertainment options. The features include: A television antenna and tuner, A/V input jacks, video-game input jacks, audio-out cables, an FM transmitter cable, and wireless headphone transmitters.

DETAILED DESCRIPTION OF THE PREFERRED EMBODIMENT

Figure 1:
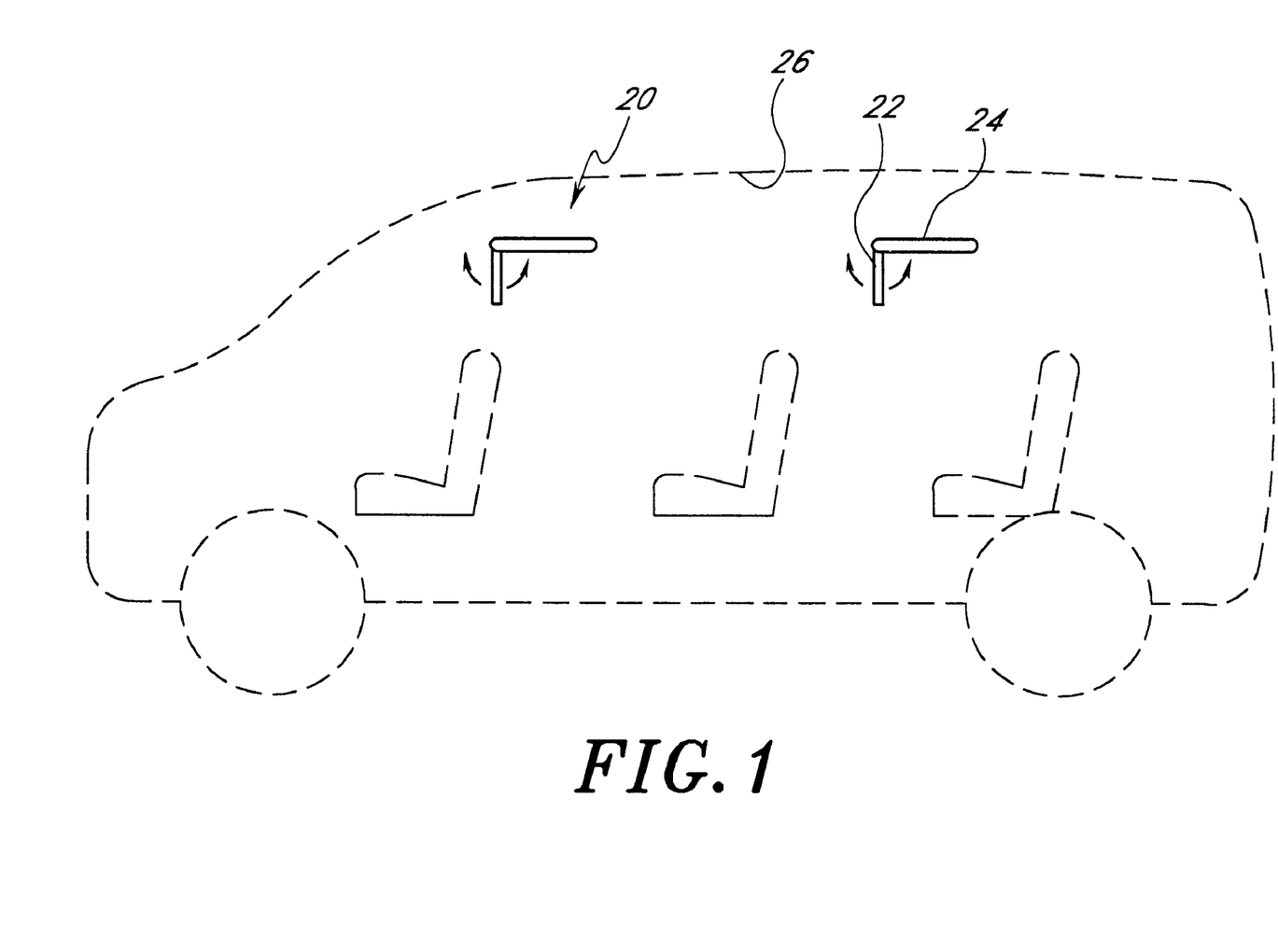
FIG. 1 is a side view of a preferred embodiment of a vehicle roof mount of the present invention disposed within a vehicle.

The invention provides a vehicle roof mount 20 for a video display 22, as illustrated in FIG. 1. It will be understood by one of skill in the art that the invention may be used to mount, among others, television monitors or navigation units that receive airborne signals, as well as closed circuit monitors that receive signals from a source within the vehicle. For the sake of simplicity, the term "display" or "video display" will be used throughout to refer to the visual display component of the invention. No intention to limit the scope of the invention to any particular type of visual display is implied.

Figure 2:
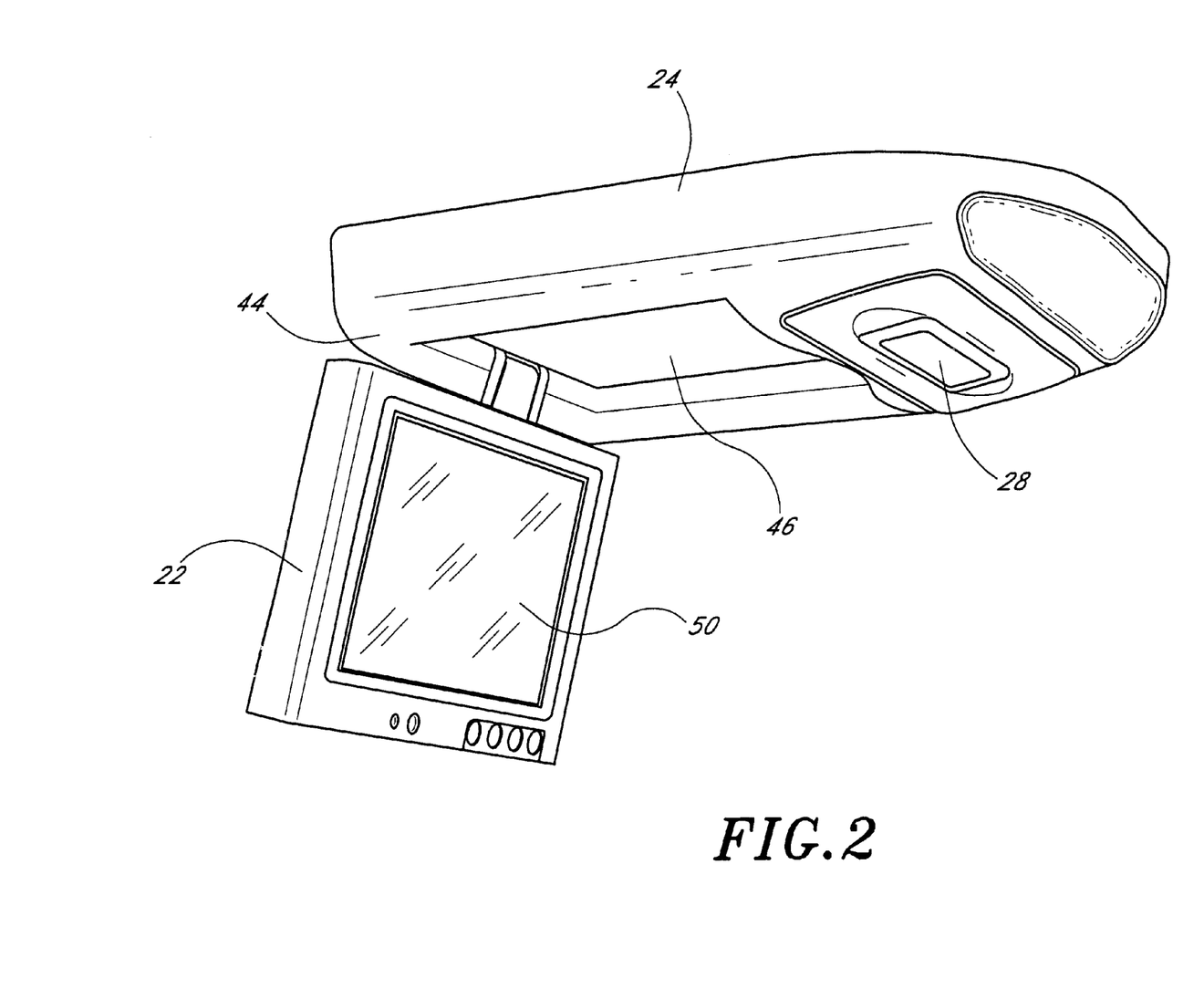
FIG. 2 is a perspective view of a preferred vehicle roof mount of the present invention illustrating the display in a viewing position.

The vehicle roof mount 20 of the present invention comprises a housing 24 adapted to be secured to the interior of a vehicle roof 26, and a video display 22 hingedly attached to the housing 24. FIG. 2 illustrates the display 22 in a viewing position. The housing 24 features an integrated dome light 28 to facilitate manipulation of the various controls of the invention, which are described in detail below.

Figure 3:
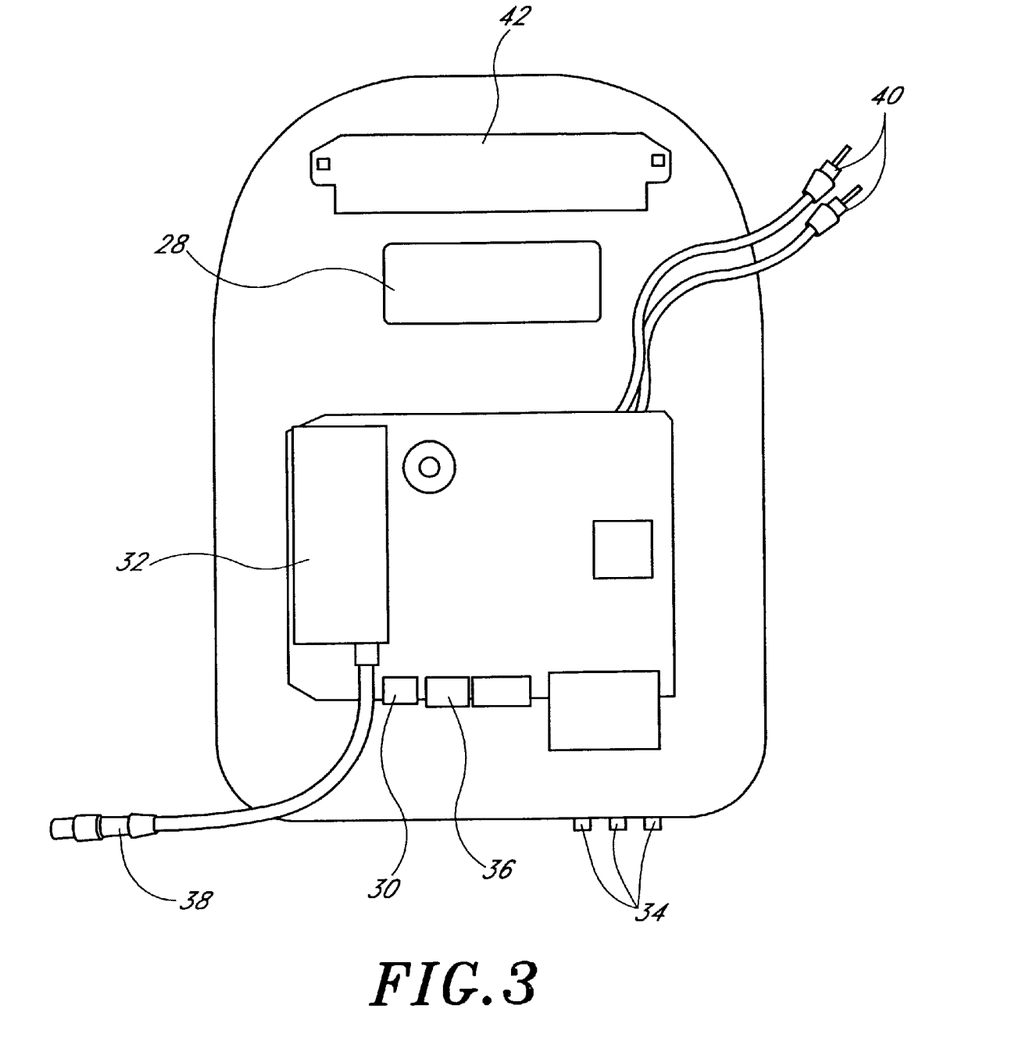
FIG. 3 is a top view of the vehicle roof mount illustrating the internal components.
Figure 4:
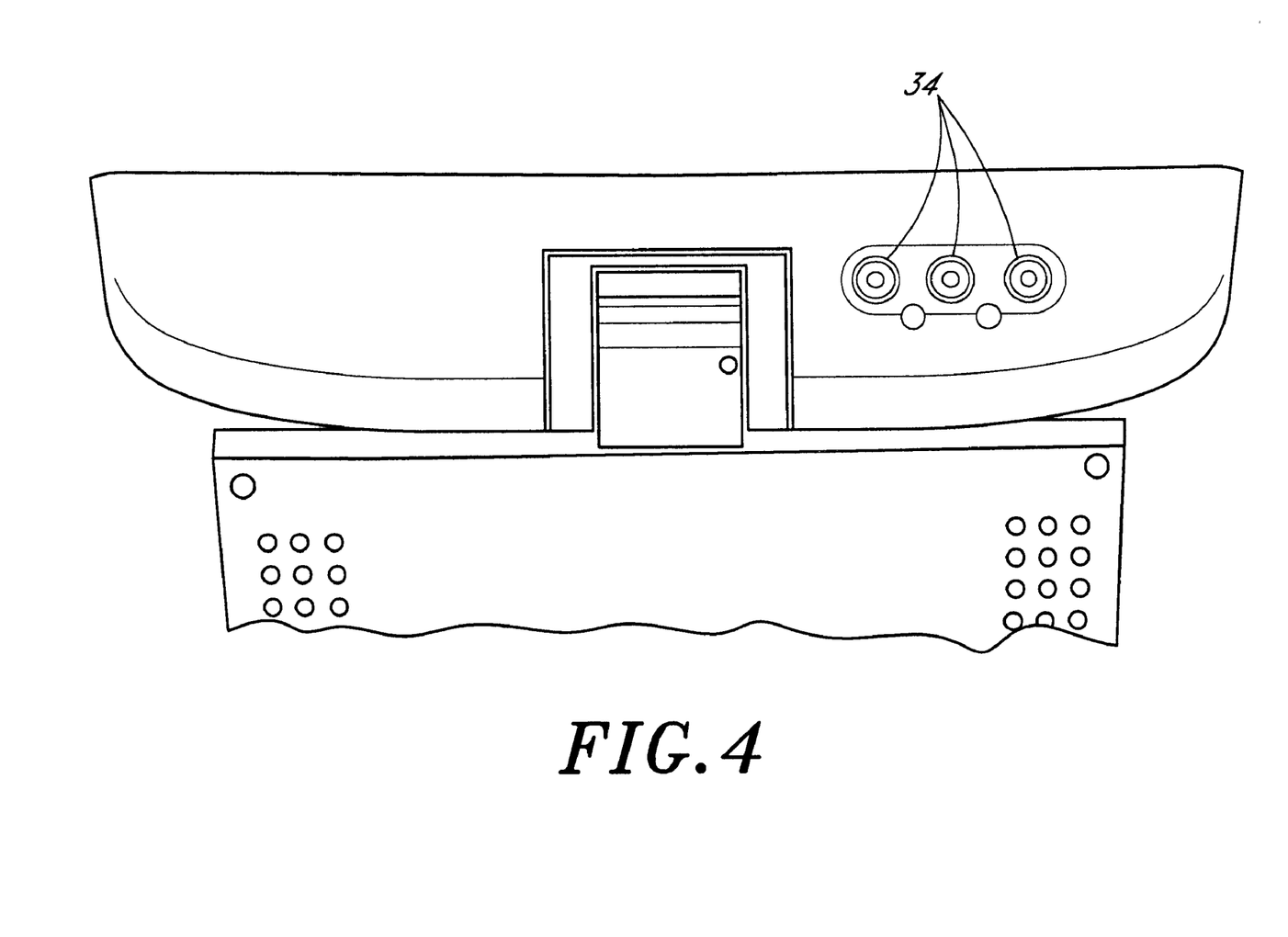
FIG. 4 is a front view of the vehicle roof mount illustrating the A/V input jacks.

The invention has a wide range of capabilities to ensure that passengers are entertained on even the longest of journeys. The internal components that enable each of these capabilities are illustrated in FIG. 3, which is a view of the inside of the housing 24 from an upper perspective. Through a UHF antenna 30 and television tuner 32, the invention can receive and display broadcast television signals. A/V input jacks 34 allow connection of a VCR, DVD player, or other similar closed circuit video source. The A/V input jacks 34, which protrude from the leading portion of the housing 24, can be seen in FIG. 4. A multi-pin input jack 36 allows a video game unit to transmit audio and video signals to the invention. If better sound quality is desired, the speakers connected to the vehicle's stereo system can be used to broadcast the audio from the unit 20 by connecting the unit's FM transmitter 38 to the stereo system. Alternatively, or in addition, audio output cables 40 allow auxiliary speakers to be connected to the unit 20. In order to reduce the level of disturbance to the driver, wireless headphone transmitters 42 are provided to broadcast the audio to headphones worn by the passengers.

Advantageously, the unit 20 is entirely self-contained and is rather easily installed. Thus it is well adapted to be installed in existing vehicles as a retrofit.

The housing 24 is preferably mounted on the vehicle roof 26 in an orientation such that the portion 44 of the housing 24 to which the display 22 is attached faces the vehicle's forward direction of travel. In this orientation, the display 22 is movable from a storage position, in which it resides inside a recess 46 in the housing 24, to a viewing position, in which the display 22 screen faces the rear of the vehicle.

Figure 5:
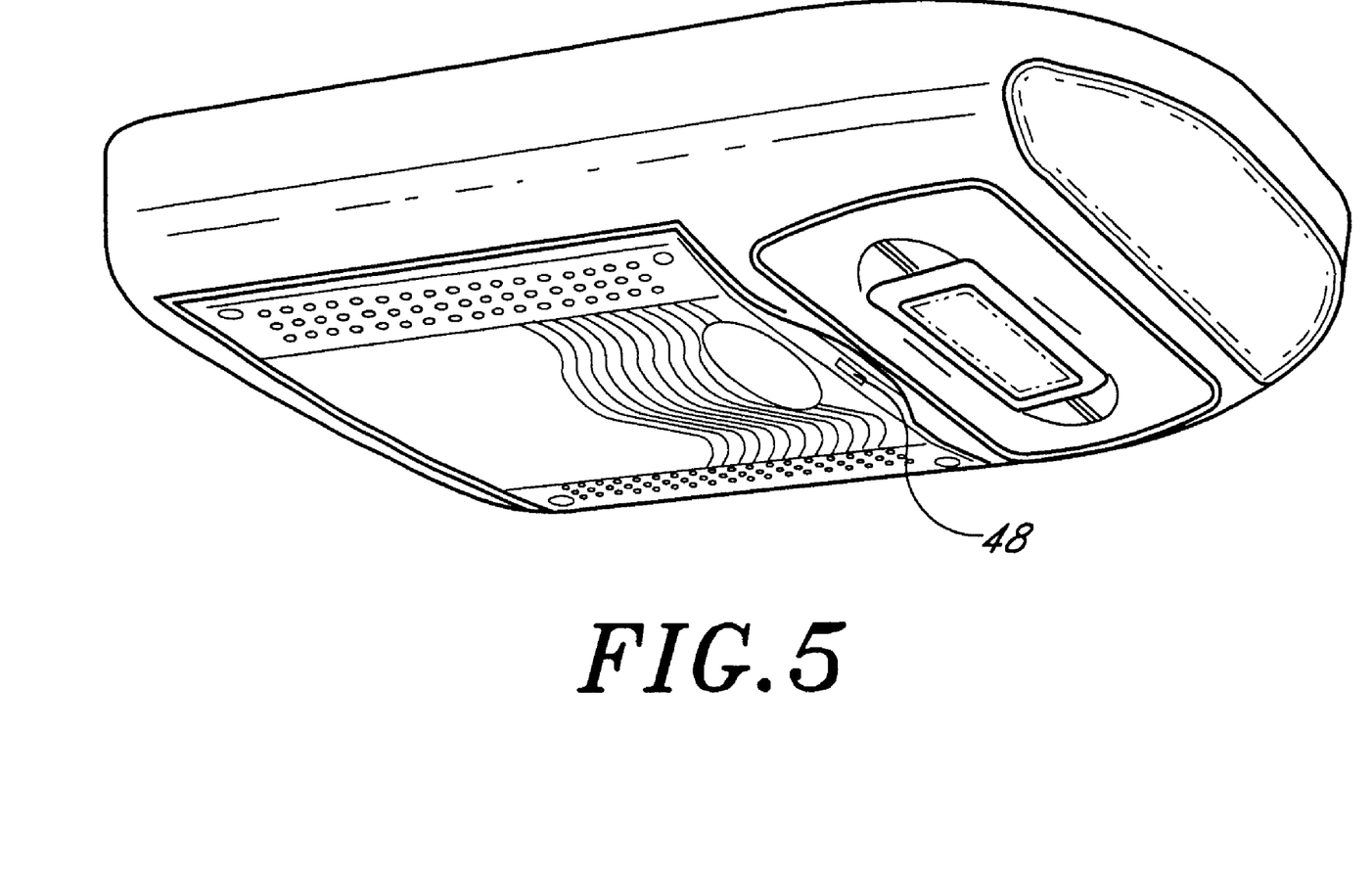
FIG. 5 is a perspective view of the vehicle roof mount illustrating the display in its storage position.

In the storage position, seen in FIG. 5, the display 22 screen faces the housing 24, out of sight of the passengers. The display 22 is held in the storage position by a slidable tab 48, which engages a notch (not shown) on the housing 24. To conserve power when the unit 20 is not in use, a micro-switch (not shown) automatically shuts off the unit 20 when the display 22 is placed in the storage position. With the display screen 50, which is typically made of glass, stowed safely inside the plastic casing of the housing 24, not only is damage to the screen 50 itself minimized, but the risk of injury to passengers from broken glass is largely eliminated.

Furthermore, with the display 22 disposed within the recess 46 of the housing 24, the unit 20 acquires a streamlined profile. Advantageously, the height of the unit 20 in this position is less than three inches. Thus it does not act as an obstruction to passengers who are moving about within the vehicle. This characteristic of the unit 20 is of course advantageous from the standpoint of crash safety, but the advantage of the low profile isn't limited to crashes and other emergency situations. This unit 20 is typically installed in vans and other large vehicles where passengers tend to climb over seats and generally move around more freely than they would in smaller vehicles. The unit's streamlined profile provides greater safety to these passengers as well by reducing the risk of inadvertent bumps against the unit 20.

Figure 6:
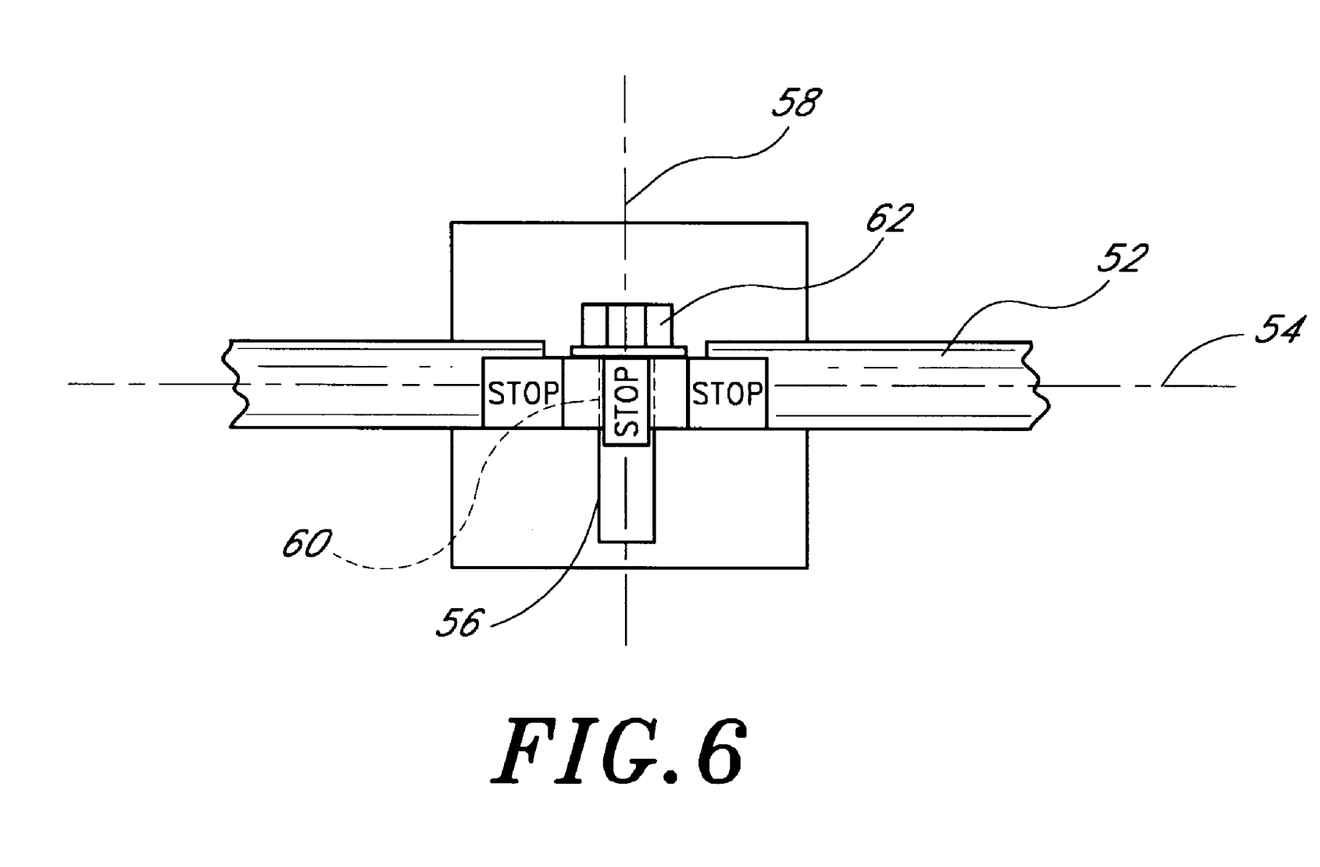
FIG. 6 is a front view of the intersecting hinges of the vehicle roof mount.
Figure 6A:
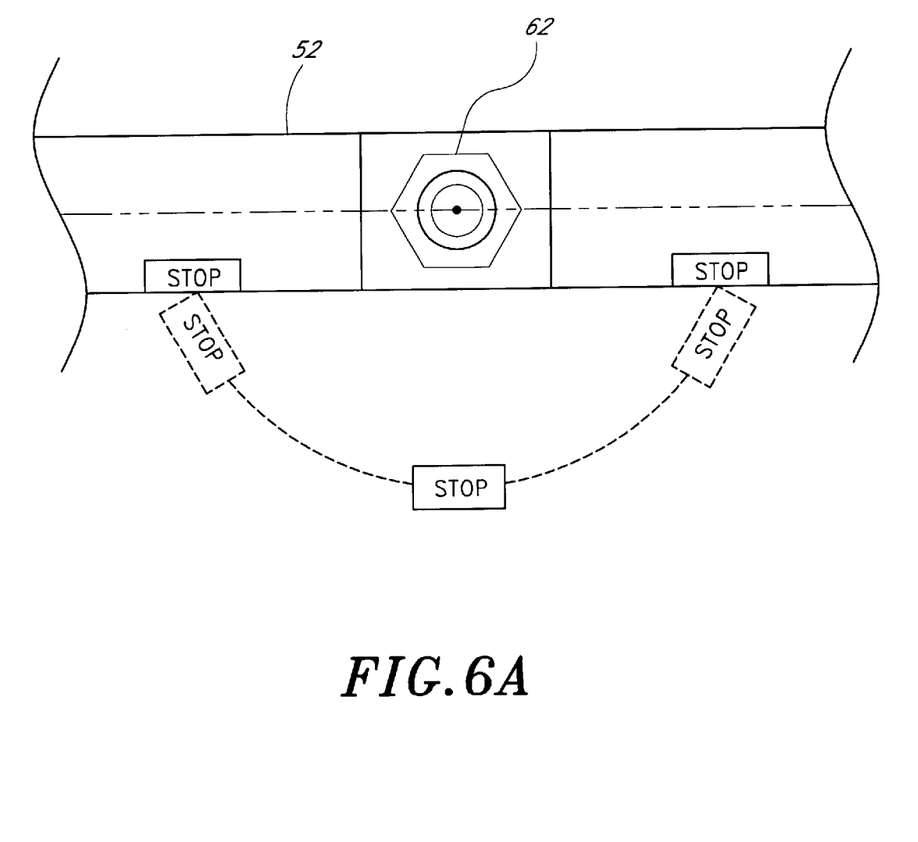
FIG. 6A is a top view of the vehicle roof mount hinge, illustrating the positive stops.
Figure 7:
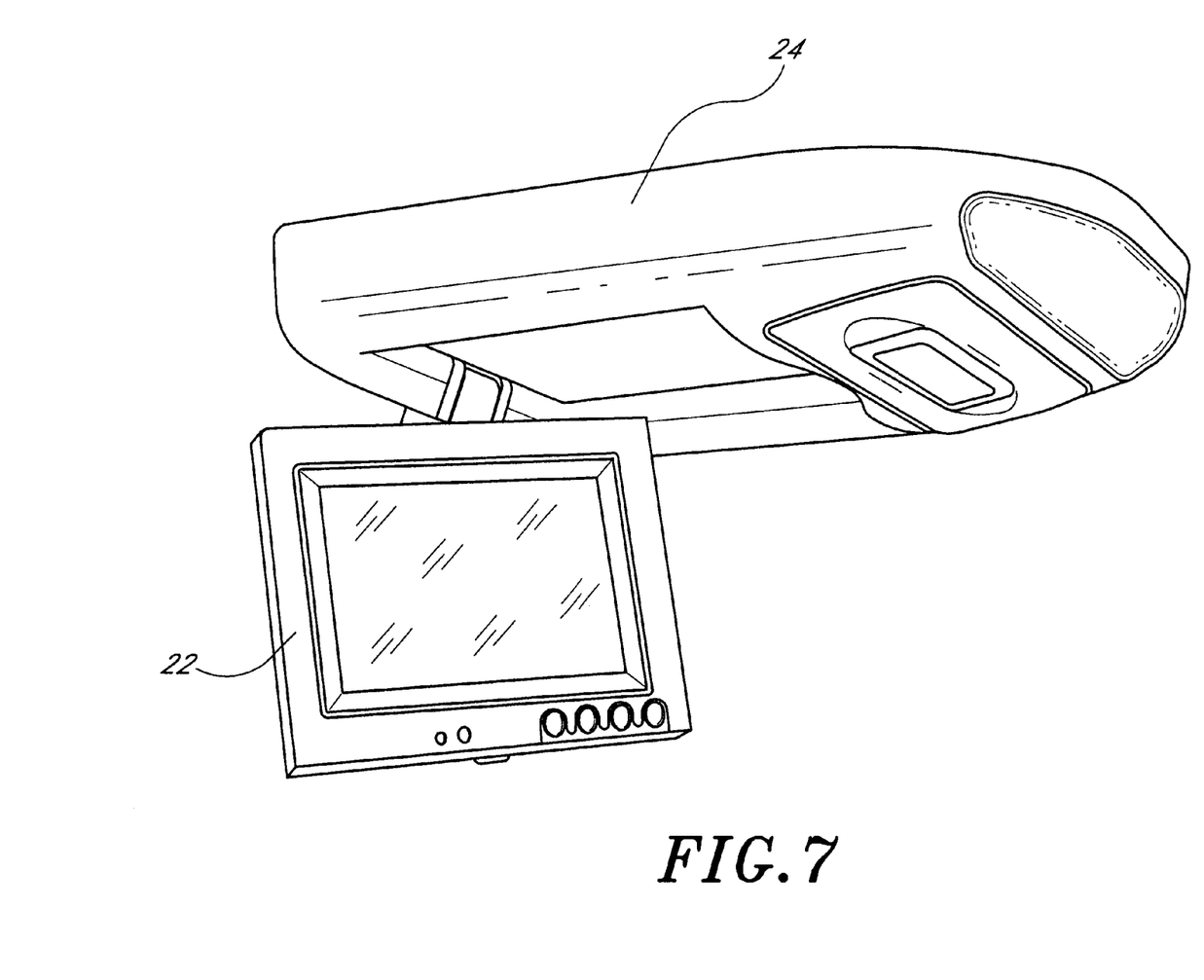
FIG. 7 is a perspective view of the vehicle roof mount illustrating the ability of the display to rotate to the side while in a viewing position.
Figure 8:
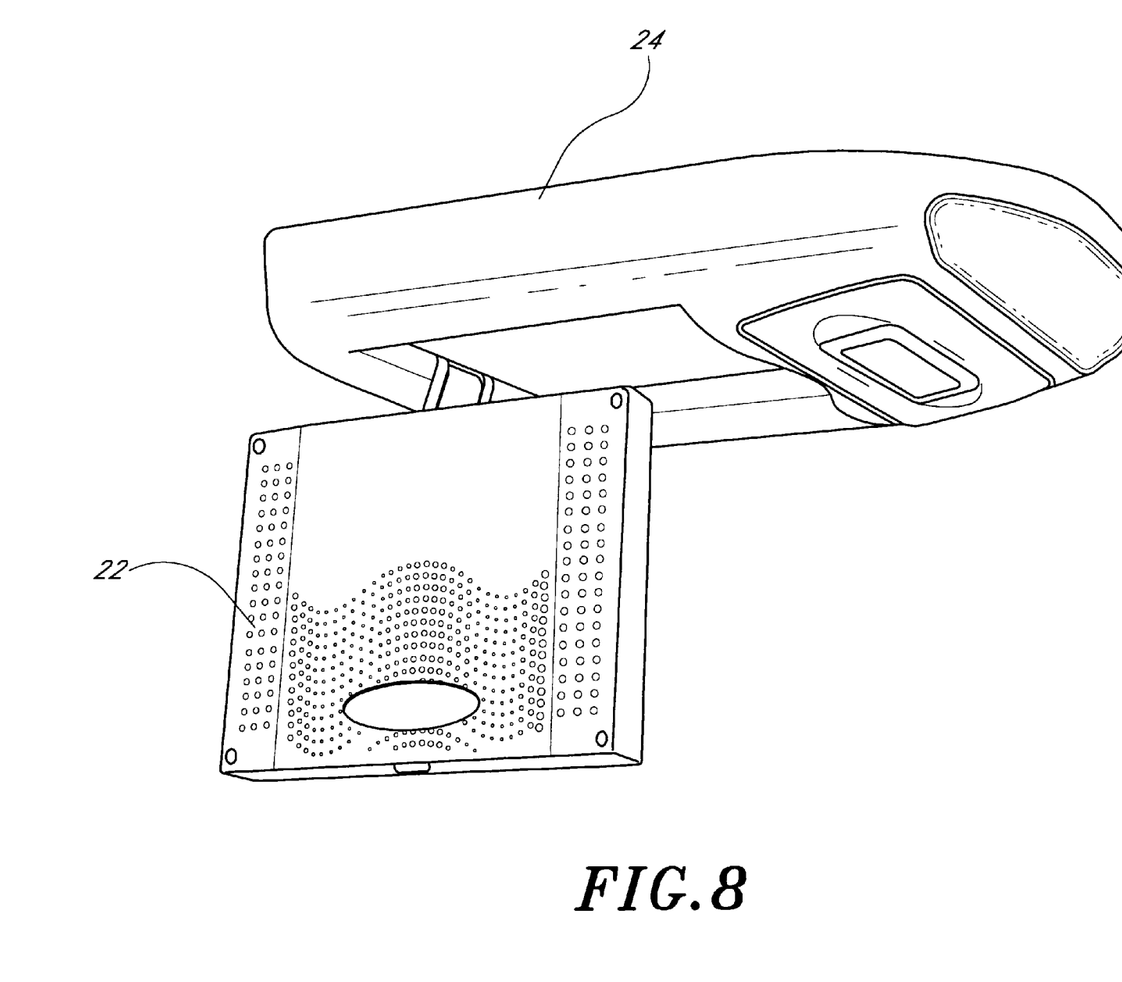
FIG. 8 is a perspective view of the vehicle roof mount illustrating the ability of the display to rotate to the side while in a viewing position.

As alluded to, the display 22 is connected to the housing 24 by hinges, which are illustrated in detail in FIGS. 6 and 6A.

Both hinges 52, 56 are self-tensioning. The first hinge 52 is essentially a cylindrical axle as shown in FIG. 6. The ends of the first hinge 52 are disposed within the housing 24 and mounted in such a way as to provide uniform resistance to rotation of the hinge 52. The second hinge 56 is also a substantially cylindrical axle that intersects the first hinge 52 through a bore 60 in its center, and is held in place with a threaded nut 62. The second hinge 56 and the bore 60 in the first hinge 52 are sized so as to provide a friction fit between the two components. The friction fit produces a uniform resistance to rotation of the second hinge 56.

Figure 9:
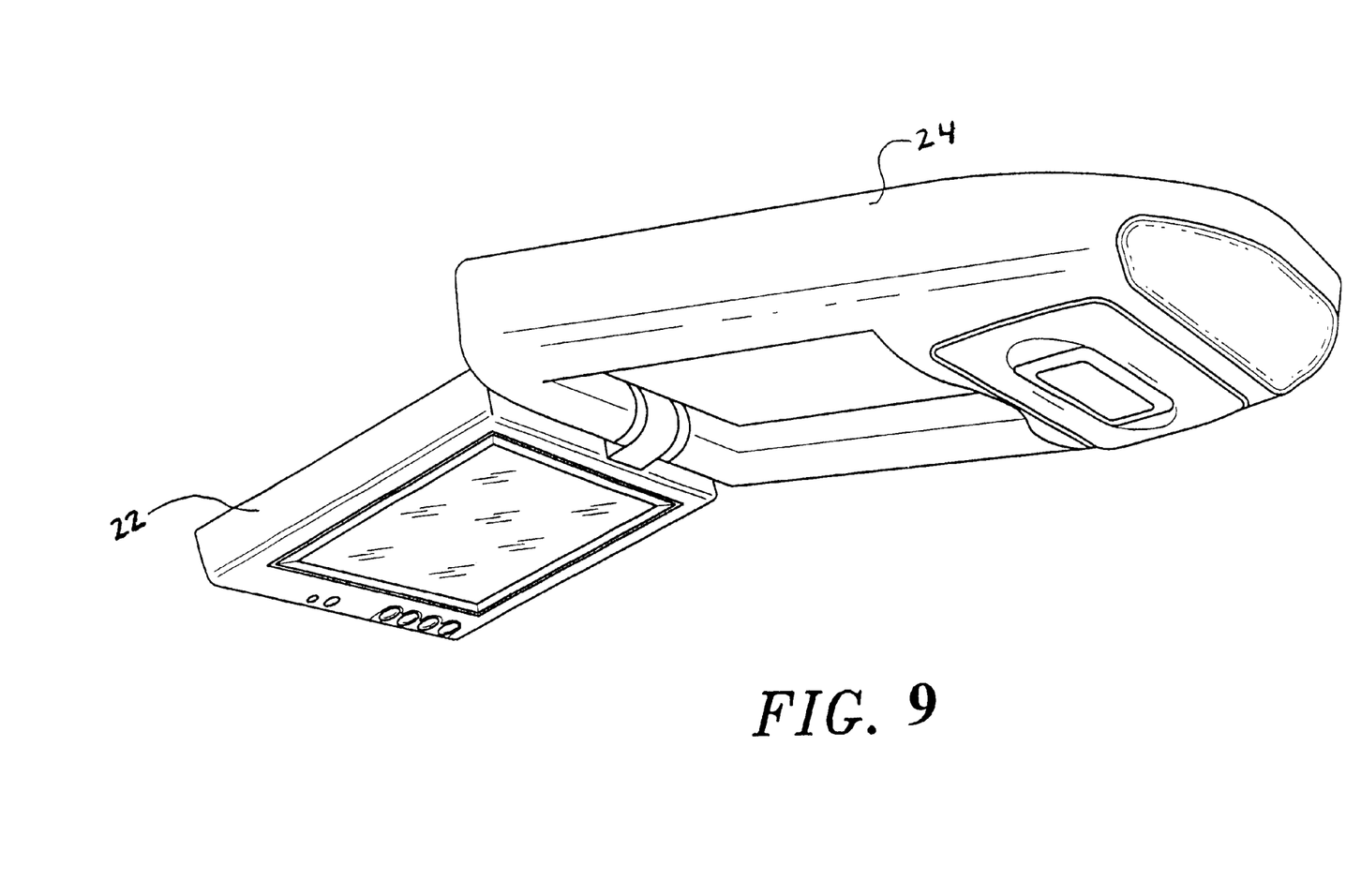
FIG. 9 is a perspective view of the vehicle roof mount illustrating the display in its fully extended position, 180° from its storage position.

The intersecting first and second axes 54, 58, and the self-tensioning character of the hinges 52, 56, provide the invention with two very important features. First, they enable the display 22 to be positioned at a wide variety of viewing angles. The display 22 may be rotated 180° about the first axis 54, from its storage position within the housing 24 to a point where it lies flat against the roof 26 in front of the housing 24, as FIG. 9 illustrates. The leading portion 44 of the housing 24 is designed so as not to interfere with the 180° range of motion of the display 22. The display 22 may also be rotated at least 30°, and preferably 45°, both to the right and to the left about the second axis 58. Positive stops (not shown) within the housing 24 prevent the display 22 from being rotated any further. Positive stops (FIGS. 6 and 6A) within the housing 24 prevent the display 22 from being rotated any further.

The second important consequence of the two intersecting axes 54, 58 is passenger safety. Whether a passenger is simply adjusting his position within the vehicle, or flying through the air as a result of a severe collision, any contact he makes with the display 22 will simply push the display 22 harmlessly out of the way. Whether the contact is made from the front or the back of the display 22, the display 22 has the ability to swing toward the roof 26, or toward the housing 24, until it lies flat against the one or the other and poses no obstruction to passengers.

Even if the display 22 is twisted to the left or right when the impact happens, it will still be pushed flat against the roof 26 or housing 24. As the display 22 nears the roof 26 or housing 24, the force of the roof 26 or housing 24 upon one edge of the display 22 will cause the display 22 to rotate about the second axis 58 until it aligns with the roof 26 or housing 24. And if a passenger contacts the display 22 from the left or right side, the rotation of the display 22 about the second axis 58 will deflect the blow, resulting in little or no-harm to the passenger.

The above presents a description of the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

What is claimed is:

1. An assembly mountable on an inside surface of a vehicle roof, said assembly comprising:
   a housing having a first side defining a mounting surface and a second side opposite said first side defining a storage location, said housing defining a first hinge portion; and
   a video display having a first face defining a video screen and a second face opposite said first face, said video display defining a second hinge portion;
   said first hinge portion and said second hinge portion cooperating to pivotably connect said housing and said video display, said first hinge portion and said second hinge portion defining a first axis that is generally parallel to said video screen;
   said video display being rotatable about said first axis 180° between a first position wherein said video screen faces said second side of said housing and said second face of said video display is contained within a first plane, and a second position wherein said video screen is contained within said first plane.

2. The assembly according to claim 1, wherein said video screen faces said second side of said housing in said first position and faces downward in said second position.

3. The assembly according to claim 1, wherein said hinge portions are self-tensioning.

4. The assembly according to claim 1, further comprising a television antenna and tuner.

5. The assembly according to claim 1, further comprising a plurality of A/V input jacks.

6. The assembly according to claim 1, further comprising at least one multi-pin input jack.

7. The assembly according to claim 1, further comprising at least one audio output cable.

8. The assembly according to claim 1, further comprising an FM transmitter.

9. The assembly according to claim 1, further comprising at least one wireless transmitter adapted to broadcast signals which are receivable by wireless headphones.

10. The assembly according to claim 1, wherein said video display is rotatable about a second axis that intersects and is generally perpendicular to said first axis.

11. The assembly according to claim 10, wherein said video display is rotatable at least 30° in either direction about said second axis.

12. The assembly according to claim 10, wherein said video display is rotatable not more than 45° in either direction about said second axis.

13. An assembly mountable on a substantially horizontal surface, said assembly comprising:
   a housing having a first side defining a mounting surface, and a second side, opposite said first side, said second side including a cavity defining a storage location and a storage location surface, said housing defining a first end having a first hinge portion, and a second end opposite said first end; and
   a video display having a first face defining a video screen, a second face opposite said first face, said display defining a second hinge portion adjacent said first end, said first surface further comprising a first corner and a second corner, said second surface further comprising a third corner and a fourth corner, said first, second, third and fourth corners being located adjacent said first end;
   said first hinge portion and said second hinge portion cooperating to rotatably connect said video display to said housing;
   said video display being rotatable about a second axis parallel to said first end between a first position wherein said video screen faces said storage location surface of said housing and a second position wherein said video screen forms a first angle with said housing; and
   said video display being rotatable about a second axis that intersects and is generally perpendicular to said first axis; wherein
   said video display is rotatable about said second axis not more than 45° in either direction from an orientation in which said video screen is parallel to said first axis, such that a force parallel to a third axis, which intersects both said first end and said second end and is perpendicular to said first axis, applied to said video display causes said video display to rotate about said first axis until one of said first or second corners contacts said storage location surface, or one of said third or fourth corners contacts a vehicle roof, and such contact causes said video display to rotate about said second axis until said video display is substantially parallel to said storage location surface when said second axis is parallel to said storage location surface.

* * * * *

UNITED STATES PATENT AND TRADEMARK OFFICE
CERTIFICATE OF CORRECTION

PATENT NO. : 6,409,242 B1
DATED : June 25, 2002
INVENTOR(S) : Chung L. Chang It is certified that error appears in the above-identified patent and that said Letters Patent is hereby corrected as shown below:

<u>Title page, Item [54] and Column 1, lines 1-2,</u>
Please correct the title from "FLAT THIN SCREEN T/V MONITOR AUTOMOTIVE ROOF MOUNT" to read -- FLAT THIN SCREEN TV/MONITOR AUTOMOTIVE ROOF MOUNT --.

Signed and Sealed this

Eighteenth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,409,242 B1
DATED : June 25, 2002
INVENTOR(S) : Chung L. Chang It is certified that error appears in the above-identified patent and that said Letters Patent is hereby corrected as shown below:

<u>Column 6,</u>
Line 26, please delete "rotatable about a second axis" and insert -- rotatable about a first axis --.

Signed and Sealed this

Fourteenth Day of December, 2004

JON W. DUDAS
*Director of the United States Patent and Trademark Office*